Figure 1:
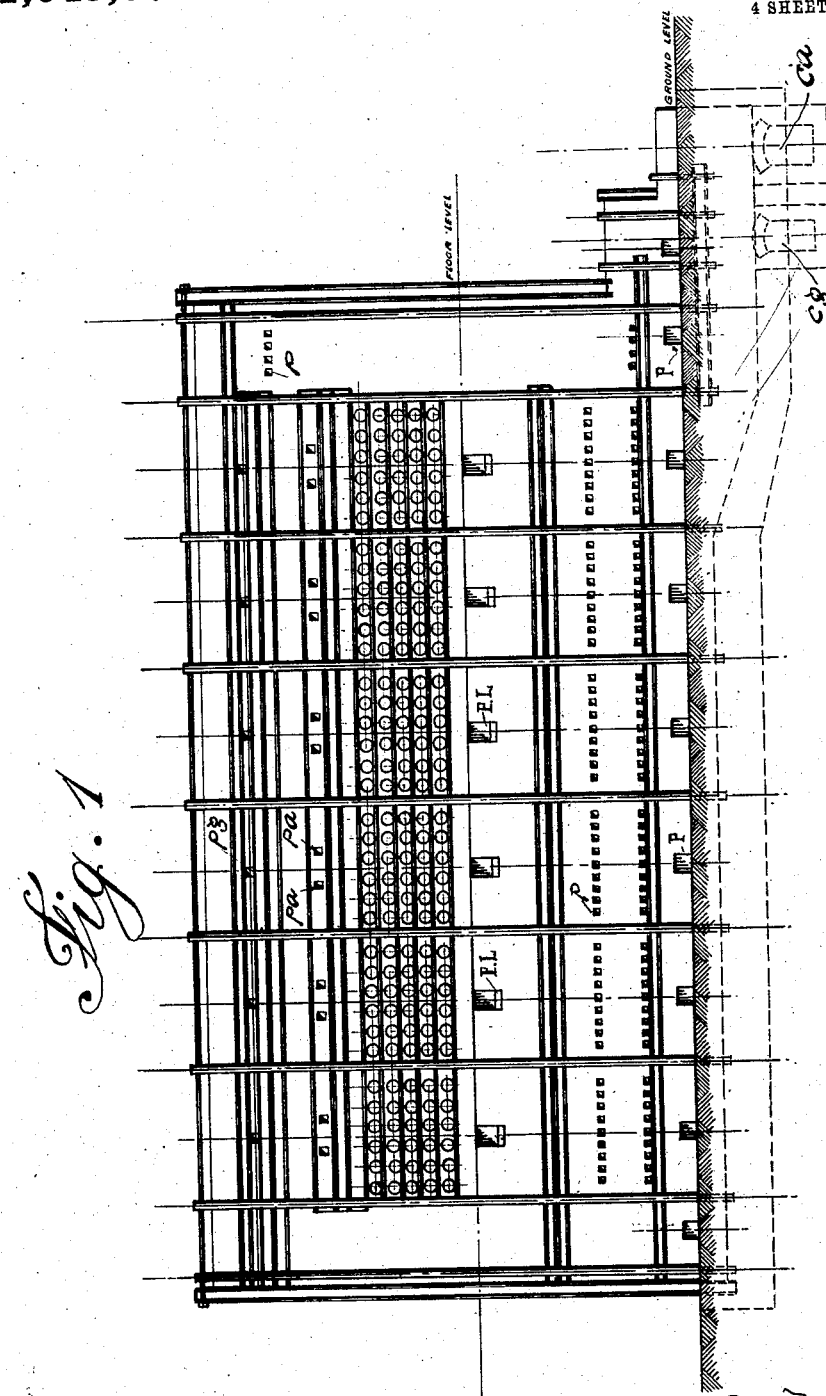

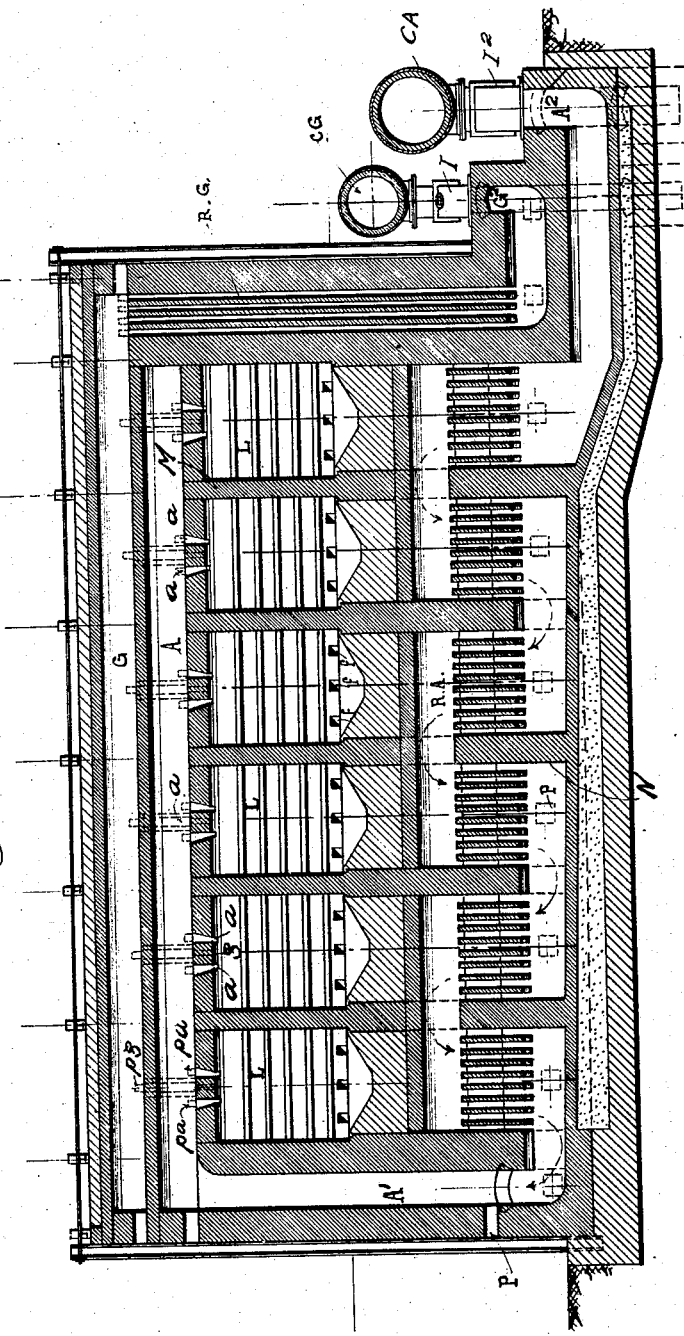

A. FOLLIET.
ZINC FURNACE.
APPLICATION FILED SEPT. 21, 1911.
1,049,570.
Patented Jan. 7, 1913.
4 SHEETS—SHEET 3.
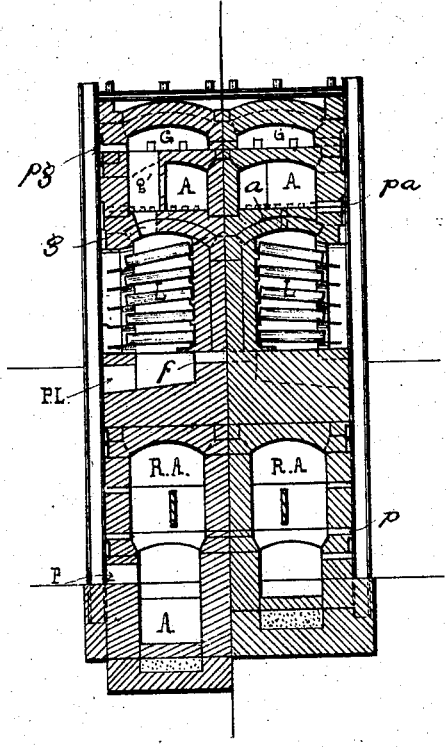
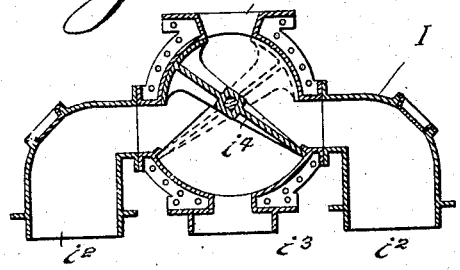
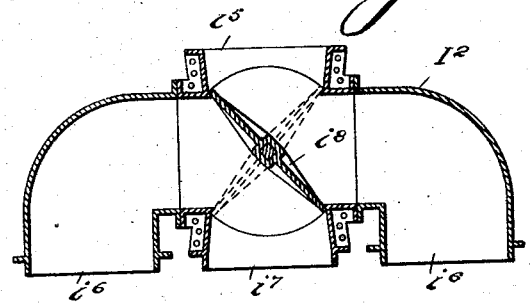

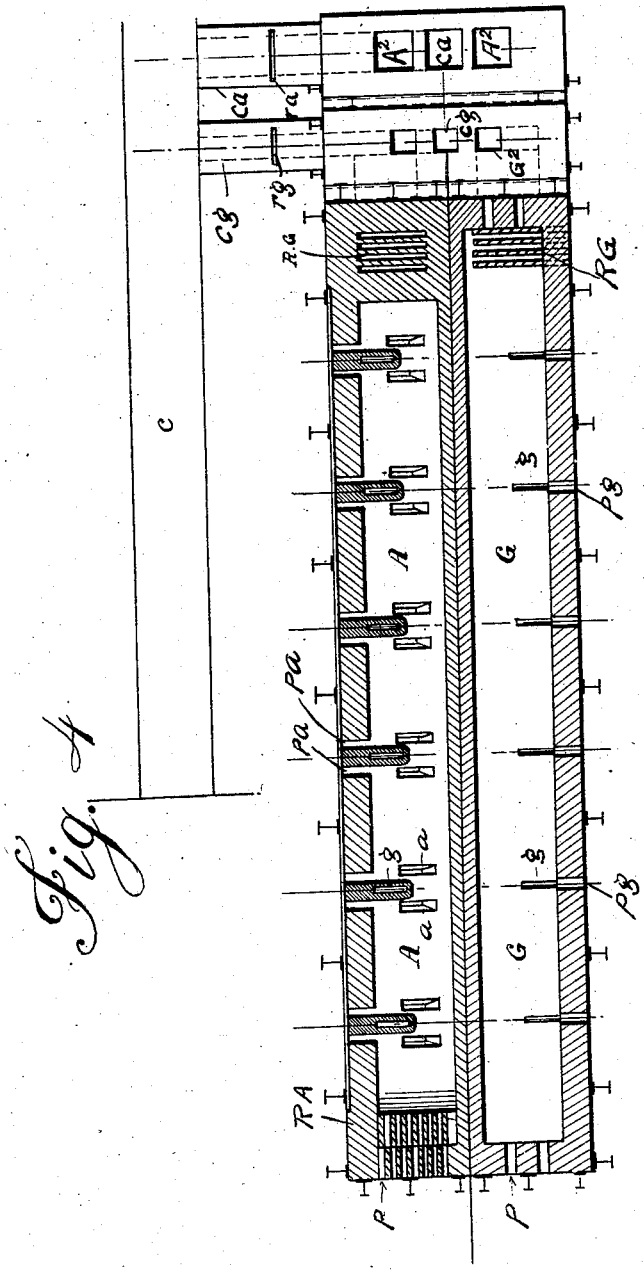

UNITED STATES PATENT OFFICE.

ALEXANDRE FOLLIET, OF BRUSSELS, BELGIUM.

ZINC-FURNACE.

1,049,570.   Specification of Letters Patent.   Patented Jan. 7, 1913.

Application filed September 21, 1911. Serial No. 650,665.

*To all whom it may concern:*

Be it known that I, ALEXANDRE FOLLIET, a subject of France, residing at Brussels, Belgium, have invented certain new and useful Improvements in Zinc-Furnaces, of which the following is a specification.

This invention relates to zinc furnaces and more particularly to retort furnaces of the type known as Belgian furnaces.

The general object of the invention is to improve such furnaces in a very material manner and in various particulars, all contributing to a much more perfect operation than has heretofore been obtained.

The various forms of gas furnaces applied to the metallurgy of zinc and known up to the present time present one or more of the following defects: poor utilization of the calorific capacity of the fuel by a defective utilization or disposition of the regenerators; difficulty, sometimes insurmountable, in obtaining a uniform distribution of heat, both in the horizontal sense and in the vertical sense, principally in furnaces of great capacity, and most frequently in those of great length; excessive consumption of refractory retorts or similar containers, even in the case of proper utilization of the calorific capacity of the fuel, because of the formation, even though temporary, of darts or jets of flame resulting from the more or less abrupt mixture of gas and air for combustion, even though this air enters the furnace by the suction of natural draft alone; difficulty in the matter of access to or regulation of the openings for introduction of air and gas, during the operation of the furnace, and difficulty in cleaning in general; inability to vary at will the manner of regeneration or of combustion; small explosions, always injurious to the refractory receptacles, at the moment of reversing, even though the operation be performed carefully; impossibility, in the great majority of cases, of utilizing poor gas for heating.

In the furnace of the present invention these various defects are eliminated and various other advantages are attained. This furnace in the particular embodiment of the invention illustrated is characterized by improved means for introducing the gas and air to the retort chambers, the division of the retort chambers into independent compartments by means of transverse partitions, the compartments being arranged back to back at the two sides of the furnace, and the compartments at opposite sides communicating with each other and being arranged in parallel between the two sets of ducts for air and gas; absolute independence of the recuperation by the gas and the recuperation by the air by means of two independent ducts with independent controlling means, leading from the reversing mechanism to the discharge and communicating with the two kinds of regenerators; a special construction of the air regenerators, which are disposed along the length of the furnace beneath the retort chambers and divided by transverse division walls into chambers communicating with each other alternately at the top and at the bottom so that the air and the burned gases are caused to travel through these regenerators in an up and down zigzag manner.

The accompanying drawings illustrate a suitable embodiment of the invention as constructed for a retort furnace.

In these views: Figure 1 is a side elevation; Fig. 2 is a vertical longitudinal section taken through the parts for the admission of air to the compartments of the retort chambers; Fig. 3 is a vertical transverse section, the two halves of the view being taken on different planes, the right-hand part being in the plane of one of the air admission ports and the left-hand part being in the plane of one of the gas admission ports; Fig. 4 is a sectional plan, the two halves of the view being taken on different planes, one side of the furnace being cut through the air duct and the other through the gas duct; Fig. 5 is a sectional view of a reversing device; and Fig. 6 is a sectional view of another reversing device.

The invention is shown as embodied in a furnace of considerable length. The interior of the furnace is divided by a longitudinal wall as is customary, and at opposite sides of this wall are the retort chambers L. In accordance with this invention a plurality of these chambers are formed at each side of the furnace by means of transverse partitions M. These partitions extend all the way from the top to the bottom and from side to side and entirely separate the members of each series of chambers from each other. Communication is provided, however, between the chambers which are back to back at opposite sides of the furnace, and preferably this communication is at the bottom of the chambers, being provided by openings *f*. In accordance with the invention these retort chambers are connected in parallel between the two sets of gas and air ducts G and A, which latter preferably, though not necessarily, extend longitudinally over the tops of the chambers L, the gas ducts above the air ducts. The gas and air ducts communicate with the chambers L by means of passages $g$ and $a$, respectively, which open through the arches into each of the chambers. Access to these passages for cleaning and for the purpose of regulating the flow of fluid therethrough, is conveniently afforded by means of the openings $pg$ and $pa$ through the outer walls of the furnace. Suitable openings PL are formed through the furnace walls at the bottoms of the chambers L, so that accumulated material may be removed therefrom.

The gas and air ports $a$ and $g$ for each chamber are grouped and formed in a special manner for obtaining a highly improved action as to mixing and combustion. As shown, the ports are in the nature of narrow slits, parallel and adjacent to each other, the gas port being always between two air ports. For most purposes a group of three ports is suitable, two air ports and a single gas port therebetween. In the best construction the gas port is in advance or outside of the air ports, that is the ports overlap but are not in lateral alinement, as shown more particularly in Fig. 4. In this connection, the best results are obtained by inclining the outer end wall of each gas port $g$ downward and inward and the inner end walls of the air ports downward and outward, as shown more particularly in Fig. 3. For many purposes it is also desirable to incline the side walls of the air ports $a$ toward the intermediate gas port, thus causing the flat air streams to converge slightly toward the flat gas stream. The mixture of the gases entering through such a group of ports is gradual and progressive, the thin streams gradually mingling by contact at their broad sides. In this way even combustion is afforded. While I have shown but one group of gas and air ports for each chamber and this group at the top of the chamber it will be understood that more groups may be employed if desirable and that the location may be different. However, the construction illustrated is the preferred one.

The gas ducts G are closed at one end and communicate at the other end each with an upright gas regenerator chamber RG, of comparatively small cross-section. At the ends adjacent these regenerators the air ducts A are closed, but their opposite ends communicate with vertical passages A'. These latter communicate with the chambers RA of the two air regenerators which extend longitudinally beneath the series of retort chambers. The chambers of each air regenerator are formed by transverse partitions N which alternately extend from the bottom toward the top and from the top toward the bottom, leaving alternate upper and lower openings between the chambers, so that the air or products of combustion, as the case may be, are caused to travel through the chambers in an up and down zigzag fashion as is indicated by the arrows in Fig. 2. It will be obvious that the brick-work in the regenerator chambers may be constructed in any suitable or approved manner. Small openings $p$ through the outer walls of the furnace permit of the cleaning of the brick-work, and larger openings P at the bottom permit of the removal of dust and other deposits from the bottoms of the regenerator chambers. The partitions N may be in vertical alinement with the partitions $m$, so that the air regenerator chambers have the same arrangement as the retort chambers, or other arrangement may be employed.

Two passages $G^2$ lead to the two gas regenerators RG, and two passages $A^2$ lead to the two air regenerators. A single passage $cg$ is provided for leading the products of combustion that have passed through either gas regenerator to the stack, and a passage $ca$ is provided for leading the products of combustion that pass through either air regenerator to the stack. As shown the passages $cg$ and $ca$ may discharge into a flue C, which conducts the products of combustion into the stack (not shown). This flue C may be extended for any suitable length, so as to serve more than one furnace. This flue and the passages $cg$ and $ca$ are preferably below the surface of the ground. In accordance with the invention these passages $cg$ and $ca$ leading from the reversing mechanism to the discharge are entirely separate, and independent controlling means, such as valves of suitable nature, indicated at $rg$ and $ra$, respectively, enable the proportions of the products of combustion passing through these two ducts to be regulated. Suitable reversing devices I and $I^2$ are provided in connection with the air regenerators and the gas regenerators respectively. A suitable embodiment of the reversing device I is shown in Fig. 2. The reversing device comprises a casing having an inlet opening $i$ at its top, with which communicates the conduit CG which leads from the gas regenerator or other source of fuel supply. The casing has also two openings $i^2$ at its bottom which register with the two openings $G^2$. In addition the casing has an opening $i^3$ in its bottom to communicate with the opening $cg$. A rotary valve $i^4$ is mounted in the casing, its relation being such that in one position it affords a passage between the opening $i$ and one of the openings $i^2$, and a passage between the other opening $i^2$ and the opening $i^3$. Upon turning the valve to its other position, indicated in dotted lines, conditions are reversed. The reversing device I² is illustrated in Fig. 6. It has a casing provided with an opening $i^5$, which communicates with the air conduit CA, openings $i^6$, which communicates with the openings A², and an opening $i^7$, which communicates with the opening ca. It also has a suitable rotary valve $i^8$, by means of which the passages afforded through the casing may be reversed. As will be readily understood, the reversing device I² for the air places either of the passages A² in communication with the passage ca to the stack and opens the other passage A² for the admission of air. In like manner the reversing device I² is movable to place either of the passages G² in communication with the passage cg to the stack and the other passage G² in communication with the gas supply.

In operation the furnace possesses numerous advantages. The control is excellent, and the retort chambers are not subject to temperature fluctuations. Moreover, the temperature maintained is uniform throughout the entirety of the furnace, irrespective of the length thereof. Any pair of opposite chambers may be regulated or cut off independently of the others, without affecting in any way the operation of the remainder of the furnace. There is no danger of a formation of darts or jets of flame or sudden or uneven combustion, even when forced draft is employed. These results are due in part to the sectioning of the combustion chambers and the arrangement so that the air and gas enter each chamber independently of the other chambers of the same series, and partly to the special formation and arrangement of the groups of air and gas ports for the several chambers. A further advantage is the improved utilization of the heat of the products of combustion through the improved construction of the air regenerators. Further, owing to the ability to instantly vary the proportions of the products of combustion passing through the air and gas regenerators, all danger of explosions is removed. The admission of air or gas or both to any one of the chambers, may be varied or cut off, independently of the other chambers by the simple expedient of inserting bricks or balls of refractory material or the like through the openings pa or pg over the slits for the admission of air and gas respectively. All of the parts of the furnace are readily accessible during operation.

In operation the reversing devices are positioned so as to place the air regenerator RA and the gas regenerator RG, at one side of the furnace, in communication with the air and gas supply, respectively, while the air and gas regenerators at the other side of the furnace are placed in communication with the two passages ca and cg leading to the stack. The valves rg and ra are adjusted so as to cause the products of combustion to pass in the desired proportions through these two separate passages, and consequently to cause similar proportions to pass through the air and gas regenerators connected therewith. If desired, the valve rg may be closed so that all of the hot gases must pass through the air regenerator, none passing through the gas regenerator. The gas and air entering at one side of the furnace flow through the passages G² and A², respectively. The gas passes upward through the gas regenerator RG, and the air passes in zigzag fashion through the air regenerator chambers RA and thence up the vertical passage A'. The air and gas, now heated to the desired degree, enter and flow along the longitudinal air and gas ducts A and G over the combustion chambers at one side of the furnace. The air and gas in these ducts are divided and enter the several chambers L by way of the slit-like air and gas ports a and g. Combustion takes place in the several chambers under the peculiar conditions insured by these supply ports, and the flame and products pass downward in each chamber, through the openings f at the bottom thereof, and into each chamber L at the other side of the furnace, where the products flow upward and pass out through the air and gas ports a and g pertaining to that side of the furnace, and thence by way of the other set of air and gas ducts A and G and the other set of air and gas regenerators to the separate passages ra and rg, by which they enter the stack. Upon reversal, the air and gas flow in the reverse manner through the furnace.

The means for introducing the air and gas into the combustion chambers and causing the gradual mixing of the gaseous fluids, in such manner as to obtain the maximum free and open expansion or development of the flame, together with a very considerable radiation of the heat, constitutes the subject-matter of my co-pending application filed of even date herewith.

What I claim as new is:

1. A zinc furnace having a longitudinal wall and transverse partitions forming two longitudinal series of retort chambers arranged back to back at opposite sides of the furnace, there being communication between the opposite chambers, longitudinally extending gas and air ducts for each series of chambers, and means connecting the pairs of opposite chambers in parallel between the two sets of ducts.

2. A zinc furnace having an elongated chamber and transverse partitions dividing the same into a longitudinal series of non-communicating retort chambers, ducts and means connecting the chambers in parallel between the ducts.

3. A zinc furnace having two longitudinal series of chambers arranged at opposite sides of the furnace, there being communication between the chambers at one side and the chambers at the other side, ducts and means connecting the pairs of opposite chambers in parallel between the ducts.

4. A zinc furnace having two longitudinal series of retort chambers arranged back to back at opposite sides of the furnace, there being communication between the opposite chambers, longitudinally extending gas and air ducts for each series of chambers, means connecting the pairs of opposite chambers in parallel between the two sets of ducts, two sets of gas and air regenerators connected with said ducts, separate and independent flues from the air and gas regenerators to the stack, and means for controlling the passage of fluid through said flues.

5. A zinc furnace having two longitudinal series of chambers arranged at opposite sides of the furnace, the chambers of each series being completely divided from each other by transverse walls, there being communication between the chambers of one series and the chambers of the other series adjacent their bottoms, longitudinally extending gas and air ducts over each series of chambers, and ports opening into the tops of the several chambers and communicating with said ducts.

6. A zinc furnace having two longitudinal series of chambers arranged at opposite sides of the furnace, the chambers of each series being completely divided from each other by transverse walls, there being communication between the opposite chambers of one series and the chambers of the other series adjacent their bottoms, longitudinally extending gas and air ducts over each series of chambers, said ducts being superposed, and ports through the arches of the several chambers communicating with the lower duct and passages leading downward from the upper ducts and terminating in ports opening through the arches of the several chambers.

7. A zinc furnace having a longitudinal division wall and a plurality of transverse partitions dividing the interior of the furnace into two series of compartments at opposite sides of the furnace, the said transverse partitions rendering the compartments of each series entirely separate and independent of each other.

8. A zinc furnace having an elongated furnace chamber, transverse walls the full height and width of said chamber dividing the same into independent compartments, and means whereby said compartments are supplied individually with heat.

9. A zinc furnace having a longitudinal wall and transverse walls forming two longitudinal series of retort chambers arranged back to back at opposite sides of the furnace, there being communication between the opposite chambers, longitudinally extending gas and air ducts over each series of compartments, means connecting the pairs of opposite chambers in parallel with the two sets of ducts, and air regenerator chambers disposed beneath said retort chambers.

10. In a retort furnace, in combination with longitudinally extending retort chambers at the two sides of the furnace, the chambers being arranged in pairs, back to back, transverse partitions between the chambers, passages communicating between the members of a pair, an air regenerator and a gas regenerator communicating with the retort chamber space at the other side of the furnace, a flue for connecting the air regenerators with the stack and a separate flue for connecting the gas regenerators with the stack, means for controlling the flow of fluid through said flues and ducts extending longitudinally of the retort chambers and having communication therewith and with the regenerators.

11. In a retort furnace, in combination with longitudinally extending retort chambers at the two sides of the furnace, the chambers being arranged in pairs, back to back, transverse partitions between the chambers, passages communicating between the members of a pair, two sets of air and gas regenerators connected respectively with the chamber spaces at the two sides of the furnace, reversing means and two separate flues, one for the air regenerators and one for the gas regenerators, leading from said reversing means to the discharge.

12. In a retort furnace, in combination with longitudinally extending retort chambers arranged back to back, the chambers being in pairs, transverse partitions separating the pairs, passages communicating between the members of a pair, two sets of air and gas regenerators, respectively connected with the chamber spaces at the two sides of the furnace, reversing means, two separate flues, one for the air regenerators and one for the gas regenerators, leading from said reversing mechanism to carry off the exhaust gases and separate means for regulating the flow through said flues.

In testimony whereof, I have signed my name to this specification, in the presence of two subscribing witnesses.

ALEXANDRE FOLLIET.

Witnesses:
CHAS. ROY NASMITH.
EMILE VAN WANSELLE.